United States Patent
Ragush et al.

(10) Patent No.: US 12,497,311 B2
(45) Date of Patent: *Dec. 16, 2025

(54) BIO-ELECTROCHEMICAL SENSOR, SYSTEM, AND METHOD FOR OPTIMIZING PERFORMANCE OF A WATER OR WASTEWATER TREATMENT SYSTEM

(71) Applicant: SENTRY: WATER MONITORING AND CONTROL INC., Charlottetown (CA)

(72) Inventors: Colin Ragush, Halifax (CA); Jack Ambler, Conshocken, PA (US); Patrick Desmond Kiely, Gatineau (CA)

(73) Assignee: SENTRY: WATER MONITORING AND CONTROL INC., Charlottetown (CA)

( * ) Notice: Subject to any disclaimer, the term of this patent is extended or adjusted under 35 U.S.C. 154(b) by 637 days.

This patent is subject to a terminal disclaimer.

(21) Appl. No.: 17/055,017

(22) PCT Filed: May 31, 2019

(86) PCT No.: PCT/CA2019/050764
§ 371 (c)(1),
(2) Date: Nov. 12, 2020

(87) PCT Pub. No.: WO2019/227236
PCT Pub. Date: Dec. 5, 2019

(65) Prior Publication Data
US 2021/0214251 A1    Jul. 15, 2021

Related U.S. Application Data

(60) Provisional application No. 62/679,626, filed on Jun. 1, 2018.

(51) Int. Cl.
*C02F 3/00* (2023.01)
*C02F 3/12* (2023.01)
(Continued)

(52) U.S. Cl.
CPC ............. *C02F 3/006* (2013.01); *C02F 3/12* (2013.01); *C12N 1/20* (2013.01); *C12N 1/36* (2013.01);
(Continued)

(58) Field of Classification Search
CPC .......... H01M 8/16; C02F 3/005; C02F 3/006; C02F 3/12; C02F 1/46; C02F 1/46109;
(Continued)

(56) References Cited

U.S. PATENT DOCUMENTS

| 11,352,272 B2 | 6/2022 | Kiely et al. |
| 11,845,680 B2 | 12/2023 | Kiely |

(Continued)

FOREIGN PATENT DOCUMENTS

| KR | 100483587 B1 * | 4/2005 | |
| WO | WO-2014172791 A1 * | 10/2014 | ............. C02F 3/006 |
| WO | 2018094537 A1 | 5/2018 | |

OTHER PUBLICATIONS

English Machine Translation KR100483587B1, pp. 1-8 (Year: 2005).*

(Continued)

*Primary Examiner* — Claire A Norris
(74) *Attorney, Agent, or Firm* — Borden Ladner Gervais LLP; Michael Damiani

(57) ABSTRACT

The present disclosure relates to a sensor for monitoring metabolic activity of a population of exo-electrogenic bacteria in response to one or more agents in oxygenated water or wastewater in a water or wastewater treatment system. The sensor comprises: at least one electrode pair comprising an anode and a cathode, the anode in electrical communi-
(Continued)

cation with the exo-electrogenic bacteria for receiving electrons therefrom; a current sensor for measuring electron flow between the anode and the cathode and producing an electrical output that correlates with metabolic activity of the exo-electrogenic bacteria; and a power source in electrical communication with the electrode pair for delivering a voltage across the electrode pair. A method, system, and exo-electrogenic bacteria used for monitoring and/or controlling one or more agents in oxygenated water or wastewater is also provided.

18 Claims, 13 Drawing Sheets

(51) Int. Cl.
| | |
|---|---|
| *C12N 1/20* | (2006.01) |
| *C12N 1/36* | (2006.01) |
| *C12Q 1/02* | (2006.01) |
| *G01N 27/327* | (2006.01) |
| *G01N 33/18* | (2006.01) |

(52) U.S. Cl.
CPC .............. *C12Q 1/02* (2013.01); *G01N 27/327* (2013.01); *G01N 33/1866* (2013.01); *C02F 2209/36* (2013.01)

(58) Field of Classification Search
CPC ........ C02F 2001/46138; G01N 27/327; G01N 33/1826; G01N 33/1866; C12N 13/00; C12N 1/20; C12Q 1/02; C12Q 1/001
USPC .................................. 204/250, 242, 403.01
See application file for complete search history.

(56) References Cited

U.S. PATENT DOCUMENTS

| | | | | |
|---|---|---|---|---|
| 2017/0045470 | A1* | 2/2017 | Burge ................ | G01N 27/4163 |
| 2017/0133700 | A1* | 5/2017 | Lozano ............... | H01M 8/0202 |
| 2022/0348483 | A1 | 11/2022 | Kiely et al. | |

OTHER PUBLICATIONS

Chen et al., "A Comparison of Bioelectricity in Microbial Fuel Cells With Aerobic and Anaerobic Anodes," Environmental Technology, Aug. 27, 2013, vol. 35 (3), pp. 286-293.

European Patent Application No. 19812264.0, Extended European Search Report dated Feb. 10, 2022.

Gugan et al., "Microbial Fuel Cells 1-15 and Their Applications for Cost Effective Water Pollution Remediation," Proceedings of the National Academy of Sciences, India Section B: Biological Sciences, National Academy of Science, India, General Secy, Allahabad, In, Nov. 26, 2015, vol. 87 (3), pp. 625-635.

Lu et al., "Effect of Oxygen on the Per-cell Extracellular Electron Transfer Rate of Shewanella Oneidensis MR-1 Explored in Bioelectrochemical Systems," Biotechnology and Bioengineering, Jul. 21, 2016, vol. 114 (1), pp. 96-105.

Ringeisen et al., "A Miniature Microbial Fuel Cell Operating With an Aerobic Anode Chamber," Journal of Power Sources, Elsevier, Amsterdam, NI, Feb. 28, 2007, vol. 165 (2), pp. 591-597.

Fedorovich et al., "Novel Electrochemically Active Bacterium Phylogenetically Related to Arcobacter Butzleri, Isolated from a Microbial Fuel Cell", Applied And Environmental Microbiology, Dec. 2009, vol. 75(23), pp. 7326-7334.

International Application No. PCT/CA2019/050764, International Preliminary Report on Patentability dated Dec. 10, 2020.

International Patent Application No. PCT/CA2019/050764, International Search Report and Written Opinion dated Aug. 16, 2019.

Kiely et al., "Anode Microbial Communities Produced by Changing From Microbial Fuel Cell to Microbial Electrolysis Cell Operation Using Two Different Wastewaters" Bioresource Technology, Jan. 2011, vol. 102(1), pp. 388-394.

Malki et al., "Preferential Use of an Anode as an Electron Acceptor by an Acidophilic Bacterium in the Presence of Oxygen", Applied And Environmental Microbiology, Jul. 2008, vol. 75(14), pp. 4472-4476.

Quan et al., "Effect of Anode Aeration on the Performance and Microbial Community of An Air-Cathode Microbial Fuel Cell", Chemical Engineering Journal, Nov. 2012, vol. 210, pp. 150-156.

Eddy, et al., "Wastewater Engineering Treatment and Resource Recovery," Fifth Edition, pp. 90-91.

Patil, et al., "Electroactive Mixed Culture Derived Biofilms in Microbial Bioelectrochemical Systems: The Role of pH on Biofilm Formation, Performance and Composition," Bioresource Technology, 2011, vol. 102, pp. 9683-9690.

European Patent Application No. 19812264.0, European Office Action dated Jul. 12, 2023.

European Patent Application No. 19812264.0, European Office Action dated Mar. 7, 2024.

European Patent Application No. 19812264.0, European Office Action dated Jun. 28, 2024.

European Patent Application No. 19812264.0, European Office Action dated Jan. 11, 2023.

* cited by examiner

BIO-ELECTROCHEMICAL SENSOR, SYSTEM, AND METHOD FOR OPTIMIZING PERFORMANCE OF A WATER OR WASTEWATER TREATMENT SYSTEM

FIELD

The present disclosure relates to a system for detecting and reducing system imbalances in water and wastewater treatment systems, and methods and sensors related thereto.

BACKGROUND

The following paragraphs are not an admission that anything discussed in them is prior art or part of the knowledge of persons skilled in the art.

The necessity of cost-efficient and reliable water and wastewater treatment processes has increased in order to meet more stringent environmental regulations and increased system reliability requirements; and, to allow operators to reduce costs associated with system operation and maintenance.

Bio-electrochemical systems are a technology that rely on bacteria that normally use insoluble metal deposits as electron sinks during anaerobic consumption of reduced substrates. By substituting an electrode pair (anode and cathode) for the metal deposits, electrical current can be collected or recorded as it passes through an external resistor. The metabolic activity and respective bioelectric current of these bio-electrochemical systems have been shown to vary according to wide ranging environmental alterations that include, water composition/chemistry (nutrient content, pH, redox state), temperature and recirculation/sheer.

Improvements in detecting and reducing system imbalances in water and wastewater treatment systems are desirable.

SUMMARY

The following introduction is intended to introduce the reader to this specification but not to define any invention. One or more inventions may reside in a combination or sub-combination of the instrument elements or method steps described below or in other parts of this document. The inventors do not waive or disclaim their rights to any invention or inventions disclosed in this specification merely by not describing such other invention or inventions in the claims.

One or more previous proposals consider that, for a bio-electrochemical system to perform its desired function, the anodic biofilm community of the system should be placed in an anaerobic liquid environment because the presence of oxygen in close proximity to the anodic microbial community has been demonstrated to have a negative impact on bio-electrochemical system activity. The presence of oxygen is thought to negatively impact the anodic communities by, for example: (1) facultative exo-electrogenic microbes preferentially utilizing oxygen as a terminal electron acceptor; (2) impairing and/or killing strict anaerobic microbes; or (3) a combination thereof. The requirement of the use of bio-electrochemical systems in an anaerobic environment has hindered the widespread adoption of bio-electrochemical systems in aerobic environments, for example, in water and wastewater treatment plants that comprise zones of aerobic, aerated, oxygenated, or partially oxygenated water or wastewater streams.

The present disclosure describes a method for producing exo-electrogenic bacteria that preferentially transfers electrons to a proximate conductive material while in an aerobic environment. The exo-electrogenic bacteria may be: (1) selected functionally during their growth at least partially in an aerobic environment; (2) produced genetically by modifying, selecting, and/or incorporating cytochromes that preferentially transfer electrons extracellularly to a proximate conductive material; (3) sufficiently layered on conductive material so that outer layers of microorganisms may shield and/or consume oxygen at a sufficient rate to reduce or limit the amount of oxygen interacting with interior exo-electrogenic bacteria layer(s); or (4) a combination thereof. The exo-electrogenic bacteria may be incorporated into a bio-electrochemical sensor that monitors one or more agents present in an aerobic environment. The bio-electrochemical sensor may be incorporated into a system for monitoring and/or controlling the delivery of the one or more agents in an aerobic environment. Methods of monitoring and/or controlling the delivery of the one or more agents in an aerobic environment are also described.

One or more examples of the presently disclosed exo-electrogenic bacteria, sensors, methods, and systems may: (1) reduce the cost of operation; (2) decrease the amount of costly equipment; (3) increase efficiency and/or performance of water and wastewater treatment systems (4) increase accuracy and/or precision of measurements; (5) expand the locations of use in a water or wastewater treatment system; (6) reduce energy consumption; (7) reduce use of chemical addition and/or carbon addition; (8) increase the quality of the effluent; (9) reduce the amount of manual sampling; allow for larger flowrates to move through the systems; (10) increase the efficiency of food to mass ratios, recirculation rates, sludge wasting, and/or the mixed liquid suspended solids concentration; or (11) a combination thereof, in comparison to exo-electrogenic bacteria, sensors, methods and systems that require an anaerobic environment to operate desirably.

The present disclosure discusses a method for producing exo-electrogenic bacteria that respires to an electrically conductive surface in an aerobic environment. The method may comprise the steps of: adding exo-electrogenic bacteria to an oxygenated mixture comprising feed solution; and selecting exo-electrogenic bacteria that is biologically active in the oxygenated mixture.

The electrically conductive surface may be carbon fiber, activated carbon, graphene, stainless steel, platinum, iron, or a combination thereof.

The aerobic environment may be an aerated or partially aerated water or wastewater stream, wastewater treatment system, water treatment system, stirred reactor, agitated reactor, moving reactor, or a combination thereof.

The exo-electrogenic bacteria may respire to the electrically conductive surface with a tendency of about 10%, about 25%, about 30%, about 40%, about 50%, about 60%, about 70%, about 75%, about 80%, about 85%, about 90%, about 95%, about 100%, greater than the tendency the exo-electrogenic bacteria respires to the aerobic environment. Respires to the aerobic environment may comprise transferring at least one electron to oxygen.

The exo-electrogenic bacteria may be coupled to the electrically conductive surface before being added to the oxygenated mixture.

The method may further comprise at least one replacement of the oxygenated mixture with additional oxygenated mixture before selecting the exo-electrogenic bacteria that is biologically active. The exo-electrogenic bacteria may be monitored for biological activity for about 48 hours before replacement of the oxygenated mixture with additional oxygenated mixture. The steps of monitoring and replacing may be repeated for about 14 days before selecting the exo-electrogenic bacteria that is biologically active. The feed solution may comprise water and liquid feed, the liquid feed comprising NaHCO3, casein hydrolysate, meat extract, urea, NaCl, CaCl2, MgSO4.7H2O, and sodium acetate. The biologically activity of the exo-electrogenic bacteria may be monitored by measuring the amount of ATP. The electrically conductive surface may be an anode of an electrode pair comprising an anode and a cathode. The biologically activity of the exo-electrogenic bacteria may be monitored by measuring the transfer of electrons from the exo-electrogenic bacteria to the anode.

The present disclosure also discusses exo-electrogenic bacteria that respires to a metal in an aerobic environment produced from the presently disclosed method.

The present disclosure also discusses exo-electrogenic bacteria that respires to an electrically conductive surface in an aerobic environment, the exo-electrogenic bacteria comprising at least one cytochrome that enables at least one electron to the transfer extracellular to the electrically conductive surface and not to the aerobic environment. The transfer of at least one electron extracellular to the aerobic environment may comprise transferring the at least one electron to oxygen.

The present disclosure also discusses a bio-electrochemical sensor for monitoring metabolic activity of a population of exo-electrogenic bacteria in response to one or more agents in oxygenated water or wastewater in a water or wastewater treatment system. The sensor may comprise: at least one electrode pair comprising an anode and a cathode, the anode in electrical communication with the exo-electrogenic bacteria for receiving electrons therefrom; a current sensor for measuring electron flow between the anode and the cathode and producing an electrical output that correlates with metabolic activity of the exo-electrogenic bacteria; and a power source in electrical communication with the electrode pair for delivering a voltage across the electrode pair.

The exo-electrogenic bacteria may respire to the anode in the oxygenated water or wastewater. The bio-electrochemical sensor according to the present disclosure may comprise the exo-electrogenic bacteria according to the present disclosure.

The one or more agents may be oxygen.

The oxygenated water or wastewater may be an influent water or wastewater stream, and the bio-electrochemical sensor may be positionable within the influent water or wastewater stream.

The one or more agents may be organic matter. The organic matter may be one or more organic carbon compounds.

The oxygenated water or wastewater may be an effluent water or wastewater stream, and the bio-electrochemical sensor may be positionable within the effluent water or wastewater stream.

The one or more agents may comprise at least one cleaning agent. The at least one cleaning agent may comprise sodium hypochlorite, peracetic acid, citric acid, or a combination thereof.

The current sensor may comprise a terminal electron accepter in electrical communication with the cathode for receiving electrons therefrom, and a resistor in electrical communication with the terminal electron acceptor, wherein electric current is measured across the resistor.

The terminal electron accepter may be a non-oxygen electron acceptor. The non-oxygen electron acceptor may be H+ or $CO_2$.

The present disclosure also discusses a cell for removing oxygen from an aerated water or wastewater stream for measuring the amount of one or more agents in a water or wastewater treatment system, the cell being connectable in fluid communication upstream of a bio-electrochemical sensor. The cell may comprise: an enclosure having an outer wall defining a passageway therethrough; a support structure, couplable to the enclosure and in fluid communication with the passageway, the support structure couplable to de-oxygenating biomass.

The present disclosure also discusses a system for monitoring one or more agents in oxygenated water or wastewater in a water or wastewater treatment system. The system may comprise: a bio-electrochemical sensor for monitoring metabolic activity of a population of exo-electrogenic bacteria and providing an electrical output corresponding with the metabolic activity, the bio-electrochemical sensor comprising an electrode pair and a power source for delivering a voltage across the electrode pair; and an electrical output analyzer for analyzing the electrical output and correlating the electrical output with the one or more agents in the water or wastewater treatment system.

The system may comprise exo-electrogenic bacteria that respires to the anode in the oxygenated water or wastewater. The system may comprise exo-electrogenic bacteria according to the present disclosure.

The present disclosure also discusses a system for controlling the delivery of one or more agents in oxygenated water or wastewater in a water or wastewater treatment system. The system may comprise: a bio-electrochemical sensor for monitoring metabolic activity of a population of exo-electrogenic bacteria and providing an electrical output correlating with the metabolic activity, the bio-electrochemical sensor comprising an electrode pair and a power source for delivering a voltage across the electrode pair; an electrical output analyzer for analyzing the electrical output and providing a signal to a controller; and a pump operably coupled to the controller for controlling the delivery of the one or more agents in response to the signal.

The system may comprise exo-electrogenic bacteria that respires to the anode in the oxygenated water or wastewater. The system may comprise exo-electrogenic bacteria according to the present disclosure.

The one or more agents may be oxygen.

The pump may be a blower configured to increase or decrease the amount of oxygen in the oxygenated water or wastewater.

The oxygenated water or wastewater may be an influent water or wastewater stream, and the bio-electrochemical sensor may be positionable within the influent water or wastewater stream.

The one or more agents may be organic matter. The organic matter may be one or more carbon compounds.

The system may further comprise a heater operably coupled to the controller for controlling the amount of thermal energy delivery to the oxygenated water or wastewater in response to the signal.

The oxygenated water or wastewater may be an effluent water or wastewater stream, and the bio-electrochemical sensor may be positionable within the effluent water or wastewater stream.

The one or more agents may comprise at least one cleaning agent. The at least one cleaning agent may comprise sodium hypochlorite, peracetic acid, citric acid, or a combination thereof.

A change in electrical output beyond a threshold may produce a signal to adjust the delivery of the one or more agents. The threshold may be a deviation of greater than about 10% from an operating electrical output. The change in electrical output may be monitored over a period of time.

The electrode pair may comprise an anode and a cathode, the anode in electrical communication with the exo-electrogenic bacteria for receiving electrons therefrom; and the bio-electrochemical sensor may further comprise a current sensor for measuring electron flow between the anode and the cathode and producing an electrical output that correlates with metabolic activity of the exo-electrogenic bacteria.

The current sensor may comprise a terminal electron acceptor in electrical communication with the cathode for receiving electrons therefrom, and a resistor in electrical communication with the terminal electron acceptor, wherein an electric current is measured across the resistor.

The terminal electron accepter may be a non-oxygen electron acceptor. The non-oxygen electron acceptor may be $H+$ or $CO_2$.

The present disclosure also discusses a method of monitoring one or more agents in oxygenated water or wastewater in a water or wastewater treatment system. The method may comprise: applying power to a bio-electrochemical sensor; measuring an electrical output of the bio-electrochemical sensor and correlating the output with metabolic activity of exo-electrogenic bacteria present in the system; and correlating the electrical output with the one or more agents in the water or wastewater treatment system.

The method may comprise exo-electrogenic bacteria that respires to an anode of the bio-electrochemical sensor in the oxygenated water or wastewater. The method may comprise exo-electrogenic bacteria according to the present disclosure.

The present disclosure also discusses a method of controlling the delivery of one or more agents in oxygenated water or wastewater in a water or wastewater treatment system. The method may comprise: applying power to a bio-electrochemical sensor; measuring an electrical output of the bio-electrochemical sensor and correlating the output with metabolic activity of exo-electrogenic bacteria present in the system; delivering the one or more agents into the system; monitoring a change in the electrical output in response to the one or more agents; and adjusting the delivery of the one or more agents in response to a change in the electrical output.

The method may comprise exo-electrogenic bacteria that respires to an anode of the bio-electrochemical sensor in the oxygenated water or wastewater. The method may comprise exo-electrogenic bacteria according to the present disclosure.

The oxygenated water or wastewater may be an influent water or wastewater stream. The oxygenated water or wastewater may be an effluent water or wastewater stream.

The method may comprises adjusting the delivery of the one or more agents in response to a change in the electrical output beyond a threshold. The threshold may be a deviation of greater than about 10% from an operating electrical output. The change in electrical output may be monitored over a period of time.

The one or more agents may be organic matter. The organic matter may be one or more organic compounds.

The method may further comprise adjusting a heater to control the amount of thermal energy delivery to the oxygenated water or wastewater in response to a change in the electrical output beyond a threshold.

The one or more agents may comprise at least one cleaning agent. The at least one cleaning agent may comprise sodium hypochlorite, peracetic acid, citric acid, or a combination thereof.

The present disclosure also discusses a use of a bio-electrochemical sensor according to the present disclosure for monitoring metabolic activity of exo-electrogenic bacteria in response to one or more agents in oxygenated water or wastewater in a water or wastewater treatment system such that delivery of the one or more agents can be adjusted, as needed, in response to changes in the metabolic activity. The presently disclosed systems may comprise the presently disclosed bio-electrochemical sensors. The presently disclosed methods may comprise the presently disclosed bio-electrochemical sensors.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of examples only, with reference to the attached Figures.

DETAILED DESCRIPTION

Figure 1:
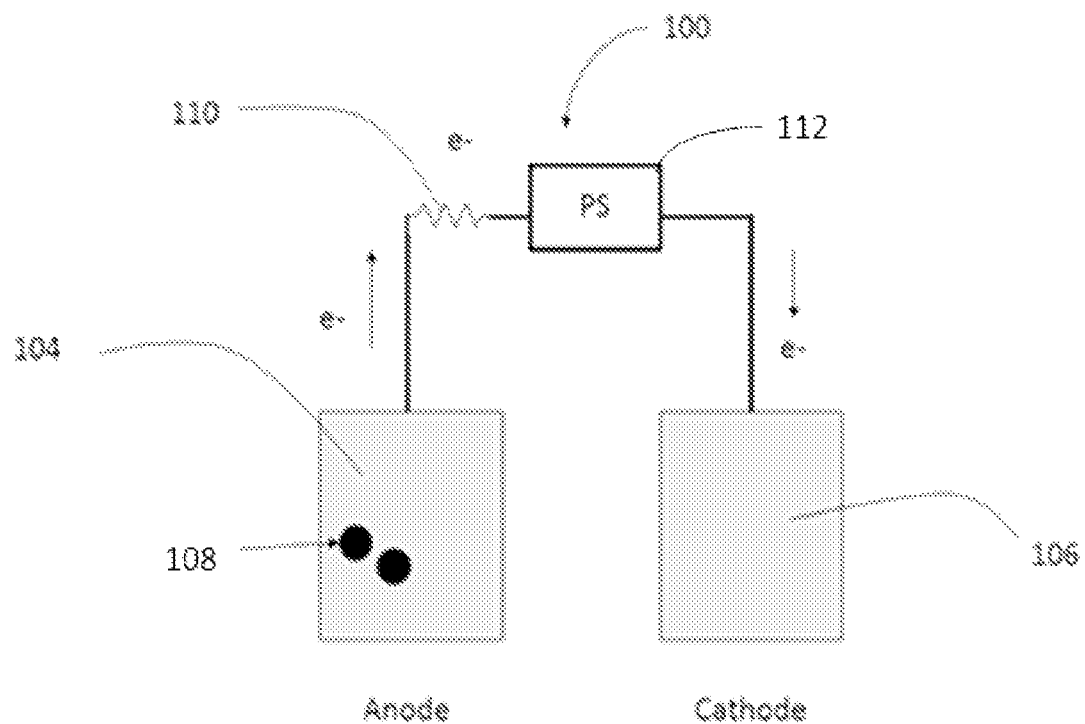
FIG. 1 is an illustration of an example of a bio-electrochemical sensor according to the present disclosure.

Generally, the present disclosure provides a method for producing exo-electrogenic bacteria that respires to an electrically conductive surface in an aerobic environment. The method comprises the steps of: adding exo-electrogenic bacteria to an aerobic, aerated, oxygenated, or partially oxygenated mixture comprising feed solution; and selecting exo-electrogenic bacteria that is biologically active in the a aerobic, aerated, oxygenated, or partially oxygenated mixture.

The present disclosure also provides exo-electrogenic bacteria that respires to an electrically conductive surface in an aerobic environment. The exo-electrogenic bacteria comprises at least one cytochrome that enables at least one electron to the transfer extracellular to the electrically conductive surface and not to the aerobic environment.

In the context of the present disclosure, the aerobic environment refers to an aerobic, aerated, oxygenated, or partially oxygenated liquid environment or zone that has at least some dissolved oxygen. The aerobic, aerated, oxygenated, or partially oxygenated environment or zone may have from about 0.1 mg/L to about 14.6 mg/L of dissolved oxygen, for example, about 0.1 mg/L; 0.2 mg/L; 0.5 mg/L; 1.0 mg/L; 1.5 mg/L; 2.0 mg/L; 2.5 mg/L; 3.0 mg/L; 3.5 mg/L; 4.0 mg/L; 4.5 mg/L; 5.0 mg/L; 5.5 mg/L; 6.0 mg/L; 6.5 mg/L; 7.0 mg/L; 7.5 mg/L; 8.0 mg/L; 8.5 mg/L; 9.0 mg/L; 9.5 mg/L; 10.0 mg/L; 10.5 mg/L; 11.0 mg/L; 11.5 mg/L; 12.0 mg/L; 12.5 mg/L; 13.0 mg/L; 13.5 mg/L; 14.0 mg/L; 14.6 mg/L; or the concentration is from one of the concentrations listed above to any other of the concentrations listed above, or any concentration therebetween. Optionally, the aerobic, aerated, oxygenated, or partially oxygenated environment or zone has from about 0.5 mg/L to about 8.0 mg/L of dissolved oxygen. Optionally, the aerobic, aerated, oxygenated, or partially oxygenated environment or zone has from about 0.5 mg/L to about 3.0 mg/L of dissolved oxygen.

In the context of the present disclosure, the water or wastewater treatment system is any system that converts water or wastewater into an effluent that can either be discharged, returned to a water cycle, or reused. The water or wastewater treatment process may comprise at least one aerobic, aerated, oxygenated, or partially oxygenated environment or zone, for example, in a chamber that receives influent water or wastewater coming into the water or wastewater treatment plant or facility, for example, a lift chamber, a primary clarifier, and/or a primary aeration chamber. Optionally, the at least one aerobic, aerated, oxygenated, or partially oxygenated environment or zone is a chamber that is discharging treated water or wastewater out of a water or wastewater treatment plant, for example, a water or wastewater chamber before and/or after the final disinfection step (e.g. UV, chlorination, ozone). Optionally, the at least one aerobic, aerated, oxygenated, or partially oxygenated environment or zone is a range of process tanks or chambers that are associated with biological nutrient removal (Nitrogen of Phosphorous removal). Optionally, the at least one aerobic, aerated, oxygenated, or partially oxygenated environment or zone is an equalization tank, a pumping station or wet well, a recirculation line, an aerobic digester, a sludge holding tank, primary, secondary, tertiary aeration chambers and/or tanks, a sequencing batch reactor which may cycle between multiple water or wastewater conditions including aerobic, or an anammox reactor.

Exo-electrogenic bacteria refers to bacteria that has the ability to transfer electrons extracellularly, and that is metabolically activatable by one or more agents in a water or wastewater treatment system. A skilled person would likely consider that exo-electrogenic bacteria in an aerobic environment would preferentially transfer electrons extracellularly to the aerobic environment rather than a proximate conductive surface. However, surprising, as described herein, the inventors discovered that: (1) modified exo-electrogenic bacteria that are: (A) selected functionally during their growth in an aerobic, aerated, oxygenated, or partially oxygenated environment; and/or (B) produced genetically by modifying, selecting, and/or incorporating cytochromes that preferentially transfer electrons extracellularly to a proximate conductive material; (2) providing a multi-layered microorganism biofilm on a conductive surface that allows for a syntrophic interaction between the layers such that the exterior layer(s) may shield oxygen and/or consume oxygen at a sufficient rate, to reduce or limit the amount of oxygen interacting with interior exo-electrogenic bacteria layer(s); or (3) a combination thereof, may be incorporated into a bio-electrochemical sensor for use in an aerobic, aerated, oxygenated, or partially oxygenated environment, as described in Examples 1 and 2.

In the context of the present disclosure, it should be understood that reference to "microbe", "microorganism" or "bacteria" includes one or more bacterium. Typically, a water or wastewater treatment system will comprise more than one type of resident bacteria. The terms "microbe and "microorganism" are used interchangeably herein to describe the one or more resident bacterium in the water or wastewater treatment system. The terms "electrogenic" and "exo-electrogenic" bacteria are used interchangeably herein.

The exo-electrogenic bacteria may comprise one of more of *Geobacter sulfurreducens*, *Geobacter metaloreducens*, *Pseudomonas aeruginosa*, and *Shewanella putrefaciens*. The number and type of exo-electrogenic bacteria may depend on the type of aerobic, aerated, oxygenated, or partially oxygenated environment. Preferably, the exo-electrogenic bacteria comprises or consists of *Geobacter sulfurreducens*.

Respiring to an electrically conductive surface refers to any process in which exo-electrogenic bacteria transfer an electron extracellularly to an electrically conductive surface rather than to its aerobic, aerated, oxygenated, or partially oxygenated environment. The exo-electrogenic bacteria may respire to the electrically conductive surface with a tendency of about 10%, about 25%, about 30%, about 40%, about 50%, about 60%, about 70%, about 75%, about 80%, about 85%, about 90%, about 95%, about 100%, greater than the tendency of the exo-electrogenic bacteria to respire to their aerobic, aerated, oxygenated, or partially oxygenated environment. Respiring to the aerobic, aerated, oxygenated, or partially oxygenated environment refers to exo-electrogenic bacteria transferring at least one electron, extracellularly, to oxygen dissolved in the aerobic, aerated, oxygenated, or partially oxygenated environment. The exo-electrogenic bacteria's aerobic, aerated, oxygenated, or partially oxygenated environment refers to the exo-electrogenic bacteria being in fluid communication with the aerobic, aerated, oxygenated, or partially oxygenated environment. Optionally, the exo-electrogenic bacteria are fully immersed in their aerobic, aerated, oxygenated, or partially oxygenated environment.

In the context of the present disclosure, "immersed" within or into an environment refers to sinking at least a portion of the exo-electrogenic bacteria into the environment, for example, about 10%, about 25%, about 50%, about 75%, about 80%, about 85%, about 90%, about 95%, about 99%, about 100%, or the percentage is from any one of the percentages listed above to any other of the percentages listed above, or any percentage therebetween, of the surface area of the exo-electrogenic bacteria is immersed into the liquid environment. Optionally, the exo-electrogenic bacteria is coupled to a bio-electrochemical sensor that is immersed wholly or partially within an aerobic, aerated, oxygenated, or partially oxygenated environment.

Producing exo-electrogenic bacteria refers to a process of generating or growing bacteria from a seed sample. The seed sample may be obtained from stock or a previously selected exo-electrogenic bacteria that is able to respire to an electrically conductive surface in an aerobic environment. The exo-electrogenic bacteria that respires to electrically conductive surface in an aerobic environment may be selected functionally and/or produced genetically.

Selected functionally during their growth in an aerobic, aerated, oxygenated, or partially oxygenated environment refers to controlling the growth parameters of exo-electrogenic bacteria that results in exo-electrogenic bacteria with the ability to respire to an electrically conductive surface in an aerobic, aerated, oxygenated, or partially oxygenated environment. Optionally, exo-electrogenic bacteria are added to an aerobic, aerated, oxygenated, or partially oxygenated mixture comprising feed solution, monitored for biological activity, and viable exo-electrogenic bacteria are selected.

In the context of the present disclosure, feed solution is any liquid mixture that contains sufficient materials to cause exo-electrogenic to grow while being biologically active. The feed solution may comprise $NaHCO_3$, casein hydrolysate, meat extract, urea, NaCl, $CaCl_2$, $MgSO_4.7H_2O$, and sodium acetate. Optionally, the concentration of the components of the feed solution are adjusted so that the final BOD measured for the solution is from about 1 mg/L to about 10,000 mg/L. Optionally, the concentration of $NaHCO_3$ is from about 50 mg/L to about 5000 mg/L, for example, about 525 mg/L. Optionally, the concentration of casein hydrolysate is from about 50 mg/L to about 5000 mg/L, for example, about 525 mg/L. Optionally, the concentration of the meat extract is from about 50 mg/L to about 3500 mg/L, for example, about 350 mg/L. Optionally, the concentration of urea is from about 20 mg/L to about 500 mg/L, for example, about 90 mg/L. Optionally, the concentration of the NaCl is from about 5 mg/L to about 10,000 mg/L, for example, about 21 mg/L. Optionally, the concentration of the $CaCl_2$) is from about 5 mg/L to about 10,000 mg/L, for example, about 10 mg/L. Optionally, the concentration of the $MgSO_4.7H_2O$ is from about 4 mg/L to about 50 mg/L, for example, about 7 mg/L. Optionally, the concentration of sodium acetate is about 250 mg/L.

Biologically active refers to any reaction between the exo-electrogenic bacteria and at least one more agents in an aerobic, aerated, oxygenated, or partially oxygenated environment that causes at least one electron to transfer extracellularly from the exo-electrogenic bacteria, wherein, the at least one electron transfers extracellularly from the exo-electrogenic bacteria to a proximate conductive material, for example, an electrically conductive surface. Biological activity may be monitored by, for example: (1) measuring the amount of ATP in the exo-electrogenic bacteria; (2) measuring the transfer of electrons extracellularly from the exo-electrogenic bacteria to the proximate conductive material; (3) measuring byproducts and/or the degradation of substrates of the exo-electrogenic bacteria; or (4) a combination thereof.

The one or more agents is any component in an aerobic, aerated, oxygenated, or partially oxygenated environment that interacts with, and affects the ability of, the exo-electrogenic bacteria to transfer an electron extracellularly. The one or more agents may be oxygen, organic matter, a toxic agent, or a combination thereof. The organic matter may be an organic carbon compound. An organic carbon compound is any molecule comprising carbon and hydrogen that metabolically activates the exo-electrogenic bacteria. Optionally, the organic carbon compound is a volatile fatty acid, organic acid, complex organic compound, methanol, ethanol, acetate, acetic acid, glycerol, molasses sugar water, MicroC™, or a combination thereof. Optionally, the toxic agent is a cleaning agent, for example, sodium hypochlorite, peracetic acid, citric acid, or a combination thereof. Optionally, the toxic agent is an inhibitor compound, for example, ammonia, heavy metals, arsenic, sulfur, temperature, salinity, phenols, cyanides, thiocyanate, p-cresol, pesticides, acids, quaternary ammonium compounds, or a combination thereof.

The conductive material or electrically conductive surface may be any material that serves as a channel or medium for electrical current. Optionally, the electrically conductive surface is made of carbon fiber, activated carbon, graphene, stainless steel, platinum, palladium, iron, carbon paper, carbon graphite, titanium, mixed metal oxides, copper, brass, silver, or a combination thereof, or any material suitable for use as an electrode. Optionally, the electrically conductive surface is an anode of an electrode pair. Current measured from the electrode pair may be correlated with the biological activity of the exo-electrogenic bacteria.

The exo-electrogenic bacteria may be proximate to the conductive material or electrically conductive surface, for example, from about 0 mm to about 5 mm away from the conductive material or electrically conductive surface. Optionally, the exo-electrogenic bacteria transfers electrons to the conductive material or electrically conductive surface via at least one mediator compound located in the environment surrounding the conductive material or electrically conductive surface. Optionally, the exo-electrogenic bacteria is coupled directly to the conductive material or electrically conductive surface, for example, the exo-electrogenic bacteria is grown on the conductive material or electrically conductive surface. Alternatively, the exo-electrogenic bacteria is coupled to the conductive material or electrically conductive surface by means of an intervening electrical linker, for example, a wire.

Monitoring the biological activity may comprise steps of monitoring biological activity for a set period of time, for example, from about 1 minutes to about 2 weeks. Optionally, following the set period of monitoring time, the aerobic, aerated, oxygenated, or partially oxygenated mixture is replaced with new aerobic, aerated, oxygenated, or partially oxygenated mixture. This cycle of monitoring and replacement may be repeated for a total time of from about 1 hour to about 2 months. Following the cycle, metabolically active exo-electrogenic bacteria may be selected. Optionally, the aerobic, aerated, oxygenated, or partially oxygenated mixture is provided to the exo-electrogenic bacteria as a continuous feed.

Genetically producing exo-electrogenic bacteria that respires to a conductive surface or electrically conductive surface in an aerobic, aerated, oxygenated, or partially oxygenated environment may comprise steps that: modify at least one cytochrome that enables at least one electron to transfer extracellularly to the conductive material or electrically conductive surface and not to the aerobic, aerated, oxygenated, or partially oxygenated environment; add at least one cytochrome that enables at least one electron to transfer extracellularly to the conductive material or electrically conductive surface and not to the aerobic, aerated, oxygenated, or partially oxygenated environment; select for at least one cytochrome that enables at least one electron to transfer extracellularly to the conductive material or electrically conductive surface; or a combination thereof.

Providing a multi-layered microorganism bacteria biofilm on a conductive surface refers to growing a sufficient thickness of microorganisms to shield oxygen from interacting with interior exo-electrogenic bacteria layers. Optionally, the microorganisms are exo-electrogenic bacteria. Optionally, the thickness of the microorganism layer(s) is sufficient to modify the mass transport limitations of oxygen through the layers of the microorganisms. In some examples according to the present disclosure, a sufficient thickness of microorganisms is from about 0.2 mm to about 5.0 mm from the conductive surface. Allowing for a syntrophic interaction between the layers refers to a more exterior layer of microorganisms consuming oxygen and decreasing the amount of oxygen that interacts with a more interior layer of microorganisms and/or exo-electrogenic bacteria.

The present disclosure also provides a cell or reactor cell for removing oxygen from an aerobic, aerated, oxygenated, or partially oxygenated water or wastewater stream for measuring the amount of one or more agents in a water or wastewater treatment system, the cell being connectable in fluid communication upstream of a bio-electrochemical sensor. The cell comprises: an enclosure having an outer wall defining a passageway therethrough; a support structure, couplable to the enclosure and in fluid communication with the passageway, the support structure couplable to de-oxygenating biomass. Optionally, the bio-electrochemical sensor is the bio-electrochemical sensor according to the present disclosure. Alternatively, the bio-electrochemical sensor may be a sensor that functions in an anaerobic environment.

A skilled person would likely consider that current produced by a bio-electrochemical sensor in an aerobic, aerated, oxygenated, or partially oxygenated environment would not accurately and/or imprecisely correlate with the metabolic activity of resident microbes because the exo-electrogenic bacteria would preferentially transfer electrons to the aerobic, aerated, oxygenated, or partially oxygenated environment rather than a proximate conductive material or electrically conductive surface. As described herein, the inventors discovered that a cell that removes oxygen from the aerobic, aerated, oxygenated, or partially oxygenated environment upsteam of the bio-electrochemical sensor results in the bio-electrochemical sensor producing a current that more accurately and more precisely correlates with the metabolic activity of resident microbes as compared to using the bio-electrochemical sensors without the cell, as described in Example 3.

The passageway may be any size provided that the aerobic, aerated, oxygenated, or partially oxygenated environment is able to pass therethrough. The enclosure may be made of any material provided that the enclosure is able to withstand the aerobic, aerated, oxygenated, or partially oxygenated environment passing therethrough. The enclosure may be made of a plastic material, metallic material, glass material, resin, epoxy, fiberglass, or a combination thereof. Optionally, the plastic material is HDPE, PVC, or silicon. Optionally, the metallic material is stainless steel or copper. The support structure may be any material that is couplable to the de-oxygenating biomass. Optionally, the de-oxygenating biomass is grown directly on the support structure. Alternatively, the de-oxygenating biomass may be connected to the support structure by way of an intervening linker. The support structure may be made of a plastic material, metallic material, glass material, carbon-based material, or a combination thereof. Optionally, the plastic material is HDPE, PVC, or silicon. Optionally, the metallic material is stainless steel or copper. Optionally, the carbon-based material is carbon mesh or activated carbon.

The de-oxygenating biomass may be grown on the surface of the support structure or the surface of the enclosure. In some examples according to the present disclosure, the de-oxygenating biomass is suspended in the cell without the requirement of a support structure.

The de-oxygenating biomass is any mass of organisms that have the ability to remove oxygen by consumption from their environment. Optionally, the de-oxygenating biomass is active bacterial biofilm comprised of a mixed microbial community. The mixed microbial community may be facultative and able to be metabolically active in the presence of oxygen or in low or no oxygen environments.

The rate at which the aerobic environment is moved through the cell may vary provided that the de-oxygenating biomass is able to consume at least about 10%, about 20%, about 25%, about 50%, about 75%, about 85%, about 90%, about 95%, or 100% of the oxygen in the aerobic, aerated, oxygenated, or partially oxygenated environment. The flow rate of the aerobic, aerated, oxygenated, or partially oxygenated environment may be adjusted to increase or decrease the amount of oxygen consumption in the aerobic environment. Optionally, the aerobic, aerated, oxygenated, or partially oxygenated environment is a water or wastewater treatment plant stream.

Optionally, the length of the cell is extended to increase the amount of oxygen consumption by the de-oxygenating biomass. Alternatively, additional cells can be positioned in series to increase the amount of oxygen consumption by the de-oxygenating biomass.

The presently disclosed exo-electrogenic bacteria may be incorporated into a bio-electrochemical sensor to monitor metabolic activity of a population of exo-electrogenic bacteria in response to one or more agents in an aerobic, aerated, oxygenated, or partially oxygenated environment. The present disclosure provides a bio-electrochemical sensor for monitoring metabolic activity of a population of exo-electrogenic bacteria in response to one or more agents in aerobic, aerated, oxygenated, or partially oxygenated water or wastewater in a water or wastewater treatment system. The sensor comprises: at least one electrode pair comprising an anode and a cathode, the anode in electrical communication with the exo-electrogenic bacteria for receiving electrons therefrom; a current sensor for measuring electron flow between the anode and the cathode and producing an electrical output that correlates with metabolic activity of the exo-electrogenic bacteria; and a power source in electrical communication with the electrode pair for delivering a voltage across the electrode pair. Optionally, the exo-electrogenic bacteria is the exo-electrogenic bacteria as presently disclosed, and the anode of the bio-electrochemical sensor is the conductive material or electrically conductive surface.

In the context of the present disclosure, the bio-electrochemical sensor is any sensor that can, with a voltage input, monitor the metabolic activity of microbes in aerobic, aerated, oxygenated, or partially oxygenated water or wastewater in a water or wastewater treatment system in real time, and provide an electrical output that correlates with the metabolic activity. Optionally, the bio-electrochemical sensor is a microbial electrolysis cell.

Without being bound by theory, bio-electrochemical sensors according to the present disclosure produce a substantially constant current under constant aerobic environmental conditions. This may be, for example, referred to as a steady-state current. Once steady-state is reached in the aerobic environment, a deviation indicates an impact on the metabolic activity of the resident microbes. For example, when a toxic component is introduced into an aerobic, aerated, oxygenated, or partially oxygenated environment, the aerobic, aerated, oxygenated, or partially oxygenated environment is imbalanced, and the metabolic activity of the microorganism community in the aerobic, aerated, oxygenated, or partially oxygenated environment can be impacted, resulting in a deviation from a reference current or steady-state current. A system operator will be able to determine a threshold deviation or threshold current at which an action is needed.

A skilled person would likely consider that current produced by a bio-electrochemical sensor in an aerobic, aerated, oxygenated, or partially oxygenated environment would not accurately and/or imprecisely correlate with the metabolic activity of resident microbes because electrons produced by the exo-electrogenic bacteria would preferentially transfer to the aerobic environment rather than a proximate conductive surface. However, the inventors discovered that: (1) modified exo-electrogenic bacteria that are: (A) selected functionally during their growth in an aerobic, aerated, oxygenated, or partially oxygenated environment; and/or (B) produced genetically by modifying, selecting, and/or incorporating cytochromes that preferentially transfer electrons extracellularly to a proximate conductive material; (2) providing a multi-layered microorganism biofilm on a conductive surface that allows for a syntrophic interaction between the layers such that the exterior layer(s) may shield oxygen and/or consume oxygen at a sufficient rate, to reduce or limit the amount of oxygen interacting with interior exo-electrogenic bacteria layer(s); or (3) a combination thereof, may be incorporated into a bio-electrochemical sensor used for monitoring and/or controlling one or more agents in an aerobic, aerated, oxygenated, or partially oxygenated environment, as described in Examples 1 and 2.

The bio-electrochemical sensor comprises at least one electrode pair comprising an anode and a cathode. Optionally, the anode of the one electrode pair is in direct electrical communication with exo-electrogenic bacteria, for example, the exo-electrogenic bacteria may be attached to, grown on, or otherwise electrically coupled with, the anode. Alternatively, the bio-electrochemical sensor is in indirect electrical communication with the exo-electrogenic bacteria, for example, but incorporating an electrical linker between the exo-electrogenic bacteria and the sensor. Optionally, at least one layer of microorganisms may be grown on or otherwise coupled to the exo-electrogenic bacteria.

The current sensor is any sensor that measures electron flow between the anode and the cathode, and produces an electrical output. Optionally, the current sensor comprises a terminal electron acceptor in electrical communication with the cathode for receiving electrons therefrom, and a resistor in electrical communication with the electrode pair, where electrical current is measured across the resistor. The resistor may operate in the range of from about 1 Ohm to about 10,000 Ohms, for example, 1 Ohm, 2 Ohms, 3 Ohms, 4 Ohms, 5 Ohms, 6 Ohms, 7 Ohms, 8 Ohms, 9 Ohms, 10 Ohms, 25 Ohms, 50 Ohms, 75 Ohms, 100 Ohms, 250 Ohms, 500 Ohms, 1,000 Ohms, 2,500 Ohms, 5,000 Ohms, 7,500 Ohms, 10,000 Ohms; or the electrical resistance is between any one of the electrical resistances listed above to any other of the electrical resistances listed above, or any electrical resistance therebetween. Optionally, the resistor is a low-Ohm resistor (about 5 Ohms). Measuring an electrical output across the resistor refers to measuring the change in electrical potential before and after the resistor.

The power source may be any power-emitting instrument that applies a voltage across the electrode pair of the bio-electrochemical sensor. The applied voltage may be from about 0.1 V to about 1.5 V, for example, about 0.1 V; 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V; or the voltage is between any one of the voltages listed above to any other of the voltages listed above, or any voltage therebetween. Optionally, the applied voltage is from about 0.3 V to about 0.9 V. Without being bound by theory, the applied voltage to the bio-electrochemical sensor may allow the sensor to utilize a non-oxygen terminal electron acceptor, for example, $H^+$ or $CO_2$. In the context of the present disclosure, a terminal electron acceptor refers to any component that receives or accepts an electron. Optionally, the terminal electron accepter is any conductive material that allows for an electrochemical reduction reaction, for example, the reduction of $H^+$ as a terminal electron acceptor in the production of hydrogen gas.

As used herein, the phrase "oxygen terminal electron acceptors" refers to use of the compound dioxygen (i.e., $O_2$) as a terminal electron acceptor. In contrast, the phrase "non-oxygen terminal electron acceptors" refers to terminal electron acceptors that are not dioxygen (i.e., $O_2$); however, this is not meant to exclude terminal electron acceptors that may be comprised of oxygen atoms, such as but not limited to $CO_2$, etc.

The presently disclosed bio-electrochemical sensors may be incorporated into systems for monitoring and/or controlling one or more agents in an aerobic, aerated, oxygenated, or partially oxygenated environment. The present disclosure provides a system for monitoring one or more agents in aerobic, aerated, oxygenated, or partially oxygenated water or wastewater in a water or wastewater treatment system. The system comprises: a bio-electrochemical sensor for monitoring metabolic activity of a population of exo-electrogenic bacteria and providing an electrical output corresponding with the metabolic activity, the bio-electrochemical sensor comprising an electrode pair and a power source for delivering a voltage across the electrode pair; and an electrical output analyzer for analyzing the electrical output and correlating the electrical output with the one or more agents in the water or wastewater treatment system. Optionally, the exo-electrogenic bacteria is the exo-electrogenic bacteria as presently disclosed. The present disclosure also provides a system for controlling the delivery of one or more agents in aerobic, aerated, oxygenated, or partially oxygenated water or wastewater in a water or wastewater treatment system. The system comprises: a bio-electrochemical sensor for monitoring metabolic activity of a population of exo-electrogenic bacteria and providing an electrical output correlating with the metabolic activity, the bio-electrochemical sensor comprising an electrode pair and a power source for delivering a voltage across the electrode pair; an electrical output analyzer for analyzing the electrical output and providing a signal to a controller; and a pump operably coupled to the controller for controlling the delivery of the one or more agents in response to the signal. Optionally, the exo-electrogenic bacteria is the exo-electrogenic bacteria as presently disclosed. Optionally, the electrode pair comprises an anode and a cathode, the anode in electrical communication with the exo-electrogenic bacteria for receiving electrons therefrom. Optionally, the bio-electrochemical sensor further comprises a current sensor for measuring electron flow between the anode and the cathode and producing an electrical output that correlates with metabolic activity of the exo-electrogenic bacteria.

The electrical output analyzer provides a signal to a controller, which in turn controls the delivery of one or more agents into the aerobic environment via a pump. The controller is any processor in communication with the bio-electrochemical sensor that accepts a signal from the electrical output analyzer and relays the signal to a pump.

The presently disclosed exo-electrogenic sensors may also be used in methods of monitoring and/or controlling a population of exo-electrogenic bacteria in response to one or more agents one or more agents in an aerobic, aerated, oxygenated, or partially oxygenated environment. The present disclosure also provides a method of monitoring one or more agents in aerobic, aerated, oxygenated, or partially oxygenated water or wastewater in a water or wastewater treatment system. The method comprises: applying power to a bio-electrochemical sensor; measuring an electrical output of the bio-electrochemical sensor and correlating the output with metabolic activity of exo-electrogenic bacteria present in the system; and correlating the electrical output with the one or more agents in the water or wastewater treatment system. Optionally, the exo-electrogenic bacteria is the exo-electrogenic bacteria as presently disclosed. The present disclosure also provides a method of controlling the delivery of one or more agents in aerobic, aerated, oxygenated, or partially oxygenated water or wastewater in a water or wastewater treatment system. The method comprises: applying power to a bio-electrochemical sensor; measuring an electrical output of the bio-electrochemical sensor and correlating the output with metabolic activity of exo-electrogenic bacteria present in the system; delivering the one or more agents into the system; monitoring a change in the electrical output in response to the one or more agents; and adjusting the delivery of the one or more agents in response to a change in the electrical output. Optionally, the exo-electrogenic bacteria is the exo-electrogenic bacteria as presently disclosed.

The herein described systems and methods may initiate, increase, decrease, or discontinue the delivery of one or more agents into an aerobic, aerated, oxygenated, or partially oxygenated environment in response to a signal produced as a result of a change in electric output when the electric output meets or exceeds a threshold. The one or more agents may negatively impact the exo-electrogenic bacteria resulting in a decrease in metabolic activity and a decrease in measured current. Alternatively, the one or more agents may positively impact the exo-electrogenic bacteria resulting in an increase in metabolic activity and an increase in measured current.

The herein described electrical output analyzer is able to analyze the electrical output from the bio-electrochemical sensor and provide a signal, when appropriate, to cause an adjustment in the aerobic, aerated, oxygenated, or partially oxygenated environment. Optionally, the signal is provided when the electrical output meets a threshold output, or deviates from a reference output.

A threshold output is an output (such as a current measurement) at which the aerobic, aerated, oxygenated, or partially oxygenated environment parameters are no longer at levels acceptable for the continuing operation or function. As would be known by one of skill in the art, determining what is considered an acceptable parameter level(s) for the operation or function of the aerobic, aerated, oxygenated, or partially oxygenated environment will be dependent on, or determined by the specific type of aerobic, aerated, oxygenated, or partially oxygenated environment. The threshold current or other output may represent a deviation from a reference operating electrical output of, for example, about 5%, about 10%, about 20%, about 50%, about 100% deviation, or the percentage is from any one of the percentages listed above to any other of the percentages listed above. The reference operating output may, for example, be a baseline or steady-state current. A skilled person, such as a manufacturer or an operator, will be able to determine acceptable levels of deviation. The threshold current may be predetermined, for example, from previous methods; known values in the art; or a value determined using alternative methods known to a skilled person. Optionally, the threshold is determined relative to the current generated from the metabolic activity of the exo-electrogenic bacteria under standard operating conditions, for example, temperature, oxygen levels, pH, pressure, or a combination thereof.

The deviation may be measured over time; and, a threshold may be set based on one or both of the deviation and time. The deviation may be measured over a period of about 1 second to about 5 hours, for example, about 1 second, 2 seconds, 3 seconds, 5 seconds, 10 seconds, 20 seconds, 30 seconds, 60 seconds, 120 seconds, 240 seconds, 500 seconds, 1000 seconds, 3600 seconds, 5000 seconds, 10,000 seconds, 18,000 seconds; or the time is from any one of the times listed above to any other of the times listed above, or any time therebetween. In some examples according to the present disclosure, the measurement is initiated about 10 seconds after the addition of one or more agents, and the aerobic, aerated, oxygenated, or partially oxygenated environment is monitored for a deviation for about 1 hour thereafter. In some examples according to the present disclosure, a threshold deviation may be a deviation of greater than about 10% from the reference operating electrical output over about 2 hours from the introduction of one or more agents into the water or wastewater treatment system. The deviation may be measured in less than about 15 seconds, about 10 seconds, about 5 seconds, about 1 second, or the time is from any one of the times listed above to any other of the times listed above, after the introduction of one or more agents or condition. The impact of the one or more agents may be visualized by the operator, or signaled by a system if it has an impact on the bio-electrochemical sensor. This variation or deviation in output from the bio-electrochemical sensor may be used to discontinue or control the addition of the one or more agents. The amount of time after the introduction of one or more agents or condition in which a change in current can be measured will depend on various factors, for example, components in the aerobic, aerated, oxygenated, or partially oxygenated environment, volumetric size of the aerobic, aerated, oxygenated, or partially oxygenated environment, the type and amount of exo-electrogenic bacteria, or a combination thereof.

The herein described systems and methods may be used to adjust the amount, type, or combination thereof of one or more agents delivered into an aerobic, aerated, oxygenated, or partially oxygenated environment. Optionally, once it is determined that the measured current has reached the determined threshold, a signal is sent to a pump that controls the delivery of the one or more agents into the aerobic, aerated, oxygenated, or partially oxygenated environment, which in turn decreases or discontinues the delivery of the one or more agents. Once it is determined that the measured current is within an acceptable range or within the threshold output, a further signal may be sent to a pump to increase or commence the delivery of the one or more agents.

An operator may affect an adjustment on the system in response to signals provided by the bio-electrochemical sensors, systems, and methods as presently disclosed. Optionally, a processor running an algorithm and in communication with the presently disclosed bio-electrochemical sensors and systems predicts imbalances on the aerobic, aerated, oxygenated, or partially oxygenated environment based on the electrical output provided by the herein described systems and bio-electrochemical sensors, and adjusts the aerobic, aerated, oxygenated, or partially oxygenated environment in response to the prediction. Optionally, the processor is a predictive learning machine.

The present disclosed systems may incorporate a presently disclosed bio-electrochemical sensor in close proximity to a portion of the water or wastewater treatment tank where the water or wastewater enters the tank, for example when monitoring and/or controlling one or more agents entering the tank from upstream sources is preferable. The present disclosed systems may also incorporate a presently disclosed bio-electrochemical sensor in close proximity to a portion of the water or wastewater treatment tank where the water exits the tank, for example when monitoring one or more agents that are exiting the tank is preferable. More than one bio-electrochemical sensor may be positioned within a water or wastewater treatment tank, for example when monitoring one or more agents at different locations within the tank is preferable. Optionally, one bio-electrochemical sensor is positioned in close proximity to a portion of the water or wastewater treatment tank where the water or wastewater enters the tank, and one bio-electrochemical sensor is positioned in close proximity to a portion of the water or wastewater treatment tank where the water exits the tank, for example when: (1) monitoring a change in the amount of the one or more agents in the tank; (2) monitoring the movement of the one or more agents in the tank; or (3) a combination there of, is preferable.

The present disclosure further provides a method of monitoring the viability of microorganisms in an aerobic, aerated, oxygenated, or partially oxygenated environment. Generally, the method comprises providing exo-electrogenic bacteria in the aerobic, aerated, oxygenated, or partially oxygenated environment. The current generated from the metabolic activity of the exo-electrogenic bacteria is measured and compared to a reference current of a viable amount of the microorganisms. If the measured current is above or below the set threshold current, an adjustment is needed. A viable amount of the microorganisms is a sufficient amount of microorganisms for the aerobic, aerated, oxygenated, or partially oxygenated environment to operate. Optionally, the presently disclosed bio-electrochemical sensors may be used in the method of monitoring the viability of microorganisms in a water or wastewater treatment system. Optionally, the exo-electrogenic bacteria is the exo-electrogenic bacteria as presently disclosed.

The present disclosure also provides a use of a bio-electrochemical sensor as presently disclosed in the methods and/or systems as presently disclosed.

Operating the herein described bio-electrochemical sensors, systems and methods in an aerobic, aerated, oxygenated, or partially oxygenated environment may: (1) decrease the amount of costly equipment; (2) increase the efficiency of the water or wastewater treatment system; (3) increase accuracy of the correlation of the electrical output and the metabolic activity of the exo-electrogenic bacteria; or (4) a combination thereof, in comparison to previously proposed bio-electrochemical sensors, systems and methods that preferably operate in anaerobic environments.

As noted above, the present disclosure provides a bio-electrochemical sensor for performing the above described methods, as well as for being incorporated into the above described systems. An exemplary sensor configuration is shown in FIG. 1. The sensor (100) generally comprises: an electrode pair comprising an anode (104) and a cathode (106), the anode (104) in electrical communication with the exo-electrogenic bacteria (108) for receiving electrons therefrom; a resistor (110) electrically coupled to the electrode pair, the electrical current being measured across the resistor (110); a power source (112) in electrical communication with the electrode pair for delivering voltage across the electrode pair; and a terminal electron acceptor (not shown) for receiving electrons from the cathode. Changes in electrical output may be used to optimize water or wastewater treatment system performance, for example, to determine optional delivery of one or more agents to the system. A change in electrical output may be measured against a set threshold to determine when an adjustment is needed.

Figure 2:
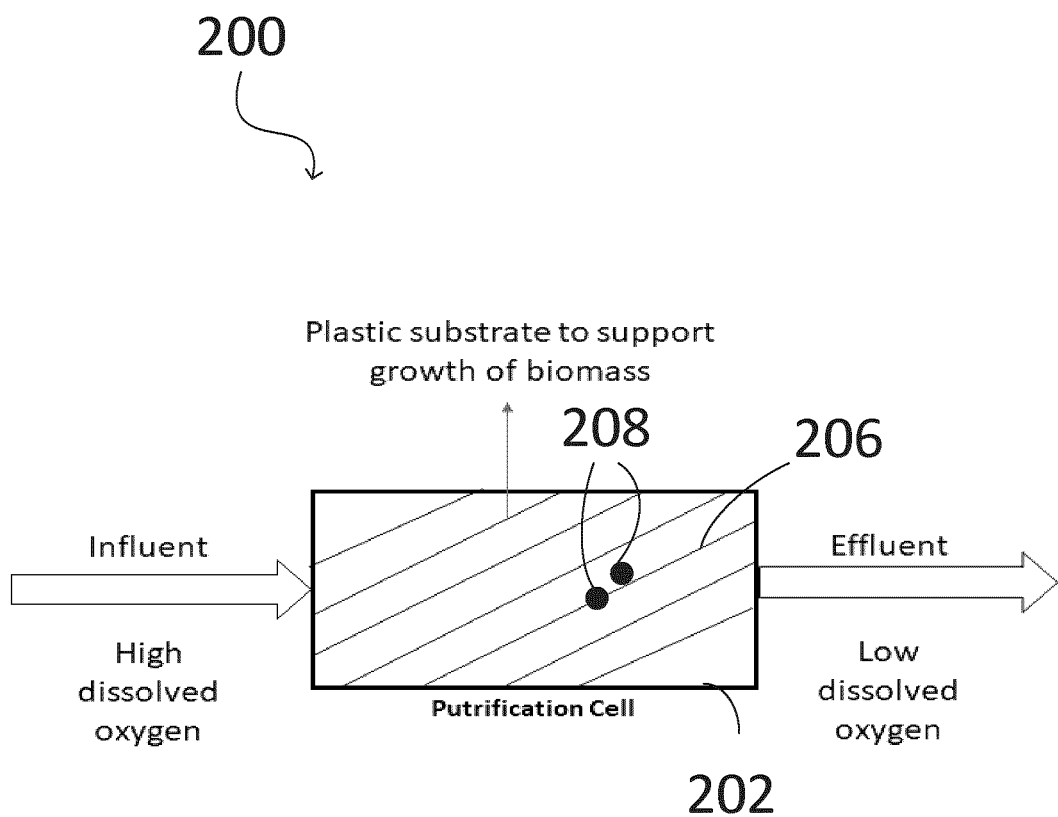
FIG. 2 is an illustration of an example of a reactor cell according to the present disclosure.

As noted above, the present disclosure provides a cell for removing oxygen from an aerated water or wastewater stream for measuring the amount of one or more agents in a water or wastewater treatment system, the cell being connectable in fluid communication upstream of a bio-electrochemical sensor. An exemplary cell is shown in FIG. 2. The cell (200) comprises an enclosure (202) having an outer wall defining a passageway therethrough (arrows); a support structure (206), couplable to the enclosure (202) and in fluid communication with the passageway (arrows), the support structure (206) couplable to de-oxygenating biomass (208).

References to other documents are made throughout this disclosure. Such documents are incorporated herein by reference in their entirety.

EXAMPLES

Example 1—Water or Wastewater Plant 1 (Influent and Duplicate Effluent BES Sensors)

Duplicate bio-electrochemical sensors according to the present disclosure were installed in a water or wastewater plant effluent channel immediately before UV lights to monitor effluent water or wastewater and two sensors were installed at the influent of the water or wastewater treatment plant (in the effluent of the primary clarifier) to monitor the impact of incoming water or wastewater. The plant is a typical water or wastewater treatment plant, with screens, primary clarifiers, activated sludge basins, secondary clarification, UV disinfection and anaerobic digestion. The plant is primarily responsible for treating organics and TSS.

For effluent monitoring, the probes were tied together to confirm reliability of the data and test two bio-electrochemical sensors in parallel. The bio-electrochemical sensors were hung into the water or wastewater stream using two wire supports. The bio-electrochemical sensors hung in a swing like application, which allowed the sensors to swing in the channel but not wrap around each other.

The operator had the ability to easily pull the effluent bio-electrochemical sensors up and shake off algae. The operator may scrape algae off the weirs manually on a regular basis because as the algae flows through the system, it may get caught on the bio-electrochemical sensors and the UV lights. This equipment is cleaned after the weirs are scraped. To accommodate the cleaning of algae off the bio-electrochemical sensors, the stainless steel cable was extended to connect to each probe and the side of the grate. Instead of connecting to the grate on each side, the wires ran through the grate and attached the two ends on the top center of the grate with a cable clamp. The operator can grab the wire on top of the grate, shake off any algae and drop it back in the channel.

The bio-electrochemical sensors were installed right before a large gate valve. To ensure the probes could not be hit by the closing valve, a third cable was added, tied around both of the bio-electrochemical sensors, short enough to prevent the bio-electrochemical sensors from hitting the gate in high flow situations. This wire was secured to the grate by creating a loop in the wire with a cable clamp and secured to the grate using a carabiner.

Figure 3A:
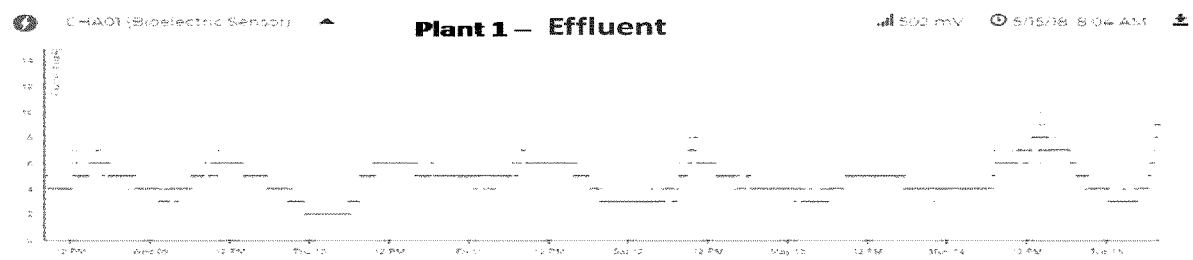
FIGS. 3A and B are graphs illustrating the data from duplicate bio-electrochemical sensors according to the present disclosure placed in the aerated or partially aerated water or wastewater effluent stream in a water or wastewater treatment system.
Figure 3B:
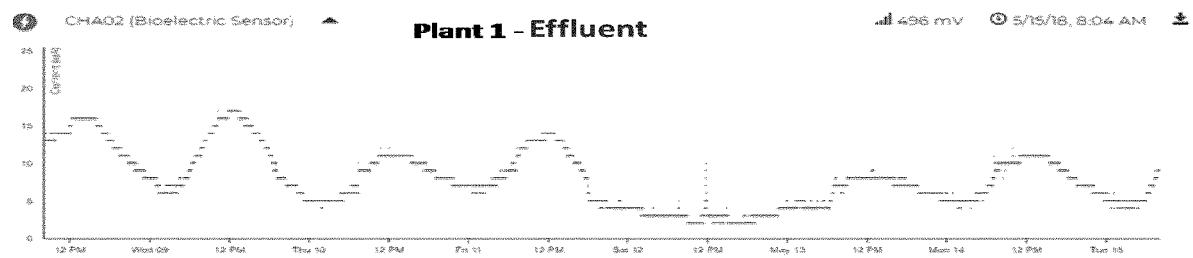

The dissolved oxygen in the effluent water or wastewater stream varied from 0.5 mg/L to 4.0 mg/L. The bio-electrochemical sensors were installed and information from the bio-electrochemical sensors was collected using an online dashboard. Data was collected from the bio-electrochemical sensors and BOD measurements were collected from the water or wastewater and correlated with output from the bio-electrochemical sensors. The bio-electrochemical sensors data is illustrated in FIGS. 3A and B.

The data collected demonstrated that the effluent bio-electrochemical sensors output is reproducible for the two bio-electrochemical sensors installed in the water or wastewater effluent stream. The range for the output was from 2-16 µA with a daily pattern emerging and the highest peaks in performance identified at 12:00 pm each day. The daily fluctuations in output from the biology is a direct measure of increased biological activity at this time and correlates with increased biological demand in the water or wastewater at this time.

BOD correlations were performed on the influent and effluent samples by plant operators. The sensor's output is that of Microbial Electron Transfer (MET). MET is specifically the measurement of electrons transferred across the resistor (or current), which is placed between the anode and cathode pairing. Plotting of this combined data shows that the sensors (MET) value at these time points predicts the BOD with an $R_2$ of 0.916. BOD sampling events of influent showed an average of 231 mg/L, with a range of 136-372 mg/L.

Key daily and weekly patterns were identified through a statistical analysis of the sensor data generated on the influent and effluent sensors.

An analysis of the daily influent cycle was performed. The night-time period between 5 PM to 8 AM showed the lowest activity, with highest influent activity occurring typically at noon.

Using this daily and weekly data, the operator can gain additional understanding of the changing demands (i.e. organic loading or toxic impacts) on the system. This allows the operator to understand logical times and days for maintenance down times (during low flow/low stress times), and better understand the stress on the system.

Using this data, additional organic loads (revenue generating) could be taken in to the facility. The sensor could be used to predict optimal times to receive these flows.

Precipitation has a pronounced effect on the water or wastewater treatment plant. Typically there is a 3-6 hour delay from the start time of a precipitation event to having an impact on the water or wastewater plant. These events can cause large changes in MET entering the system, decreasing the water or wastewater concentration by as much as 80%.

Example 2—Influent, Sludge Holding Tank, Aeration Basin and Effluent BES Sensors Bio-electrochemical sensors according to the present disclosure were installed at different tie-in locations of a water or wastewater plant. The water or wastewater treatment plant consists of screening, an activated sludge aeration basin/primary treatment tank, secondary clarification, UV disinfection, aerobic sludge digestion, sludge holding tank, and UV disinfection.

Influent sensor installation location: The bio-electrochemical sensor was installed in a channel that received raw water or wastewater entering the plant. The bio-electrochemical sensor was lowered into a trough that received the influent water or wastewater just after a series of screens and prior to the primary treatment tank. The bio-electrochemical sensor was totally submerged in water or wastewater and received flow from a pumping station.

Effluent sensor installation location: The bio-electrochemical sensor was installed in an effluent channel prior to the final effluent weir. The bio-electrochemical sensor was hung from an existing angle iron bracket in the channel. The bio-electrochemical sensor was secured using a stainless steel wire and stainless steel wire clamps. It hung approximately 2' below the water level. This water level was approximately 5" above the bottom of the V notch weir. The bio-electrochemical sensor was unable to dry out in this location even at low water levels. The bio-electrochemical sensor support wire was positioned away from the wall of the tank, away from dead spots, where there is visible flow.

Figure 4A:
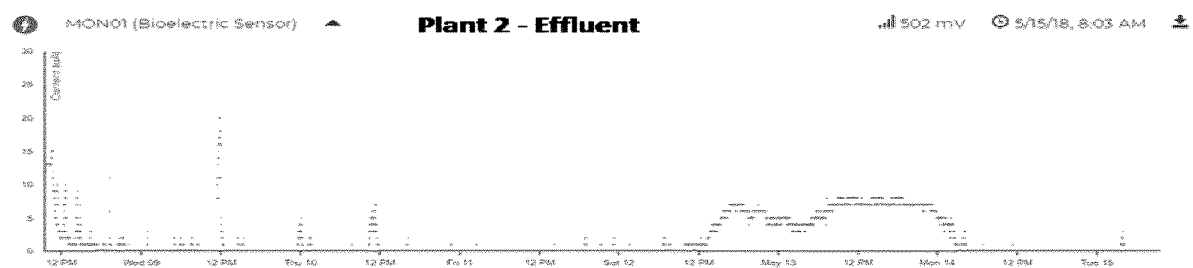
FIGS. 4A and B are graphs illustrating the data from bio-electrochemical sensors according to the present disclosure placed in the aerated or partially aerated water or wastewater effluent and influent stream in a water or wastewater plant.
Figure 4B:
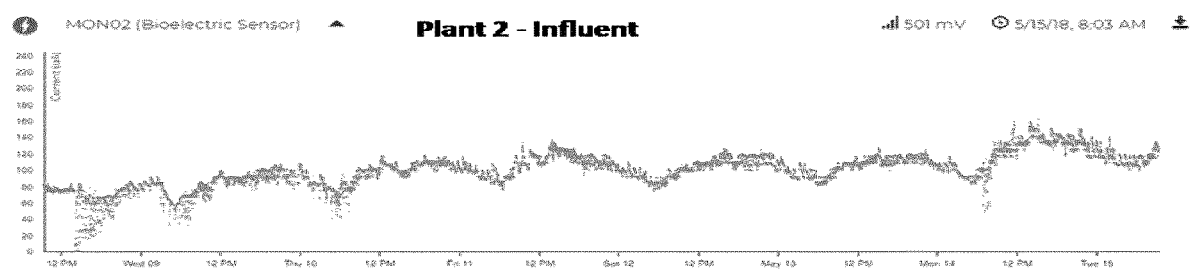

The dissolved oxygen in the water or wastewater streams was maintained at a range of 1 and 2.5 mg/L dO using a variable frequency drive blower. The bio-electrochemical sensors were installed and information from the bio-electrochemical sensors was collected using an online dashboard. Data was collected from the sensor and BOD measurements were collected from the water or wastewater and correlated with output from the bio-electrochemical sensors. BES data collected is illustrated in FIGS. 4A and B.

The data collected demonstrated that the bio-electrochemical sensor output to be significantly higher for the influent water or wastewater stream when compared to the bio-electrochemical sensor located in the effluent stream. The range for the steady state influent water or wastewater was 80-140 µA whereas the effluent water or wastewater was more variable in output and ranged from 0-15 µA. This variation in output from the bio-electrochemical sensors is reflective of the microbial metabolic activity and the presence of lower concentrations of biological oxygen demand or bio-available carbon in the effluent stream when compared to the influent water or wastewater.

Aeration Basin location: The bio-electrochemical sensor was installed directly into the activated sludge aeration basin. It was done so by connecting the sensor to a PVC pipe and lowering down into the basin. The system was installed in an attempt to contact a representative sample of the solution.

The aeration basin data output showed an interesting variation in microbial activity in the biology. The output was primarily between 20-70 µA. Trending in the location showed that there was diurnal variation of at least +/−30 μA. Highest microbial activity at ~6 am, with lowest activity between 1 pm-3 pm.

Sludge holding tank location: The bio-electrochemical sensor was installed into the sludge holding tank. It was done so by connecting the sensor to a PVC pipe and lowering down into the basin. The system was installed in an attempt to contact a representative sample of the solution.

The sludge holding data output showed a relatively low level of output. A sample was collected and brought into the lab to confirm that the output was very low. This may have been due to the fact that biological activity and compounds were limited at this location as the biology in this system would have removed most soluble organic compounds at this time.

Figure 5:
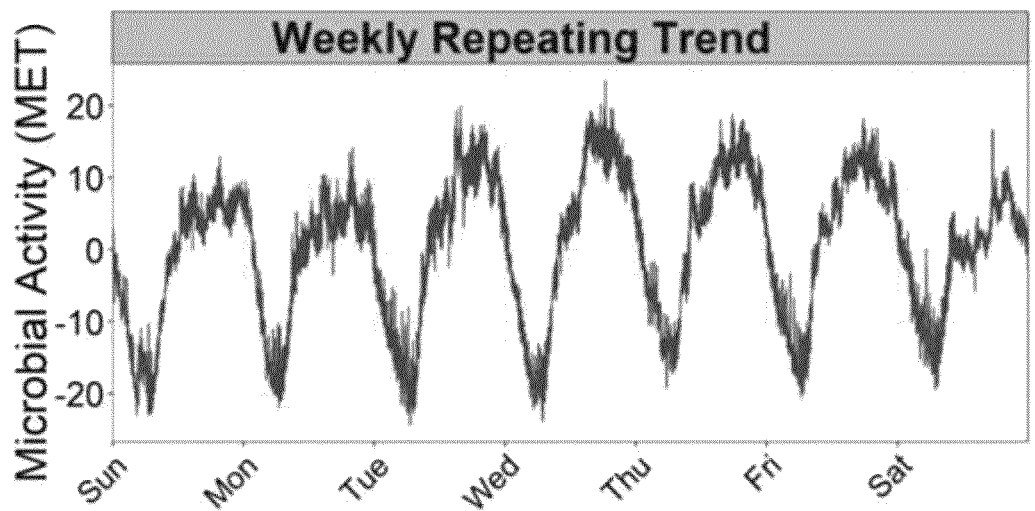
FIG. 5 is a graph illustrating weekly trend data collected from a bio-electrochemical sensor according to the present disclosure located at an influent location of a water or wastewater plant.

Observations: Analysis of the influent data showed that the nighttime period between 1 am-3 am showed the lowest organic strength, with highest influent concentration occurring between 11 am-3 pm (see FIG. 5). From reviewing at several months of data, the highest amount of stress for the facility appeared to be during the summer months (early June to mid-August), coinciding with additional summer loading the facility sees due to its seasonal location.

Figure 6:
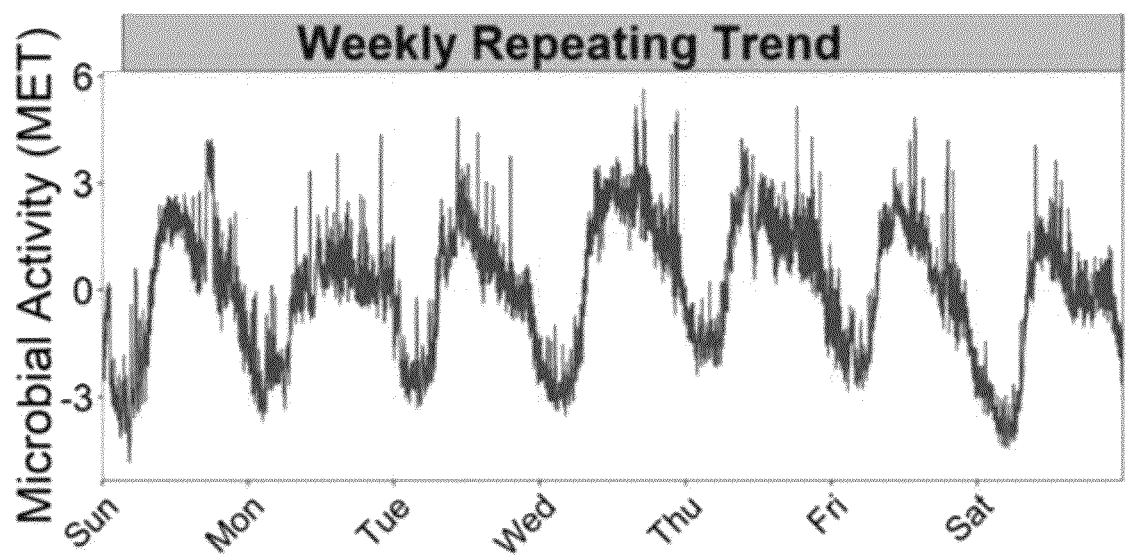
FIG. 6 is a graph illustrating weekly trend data collected from a bio-electrochemical sensor according to the present disclosure located at an effluent location of a water or wastewater plant.

Weekly trend data of the effluent showed diuranal effluent variation, with maximum MET typically between 11 am and 3 pm. Minimum concentrations tended to occur between 1 am-3 am. The weekends had the lowest concentration (see FIG. 6).

Example 3—Cell Validation

Figure 7:
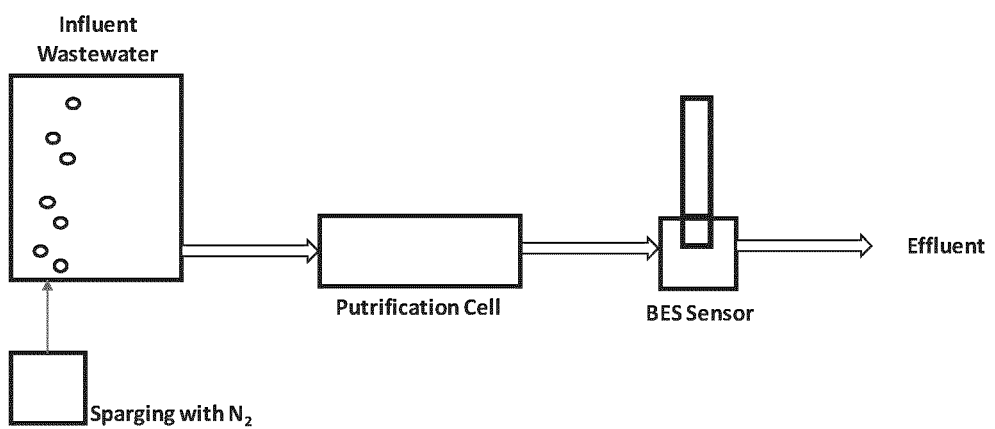
FIG. 7 is an illustration of a test system used to validate performance of a reactor cell according to the present disclosure.

To protect bio-electrochemical sensor biological communities according to the present disclosure from the potential negative impact of oxygen, the inventors tested and validated the application of a cell (putrification cell) for the removal of oxygen from a water or wastewater stream. The test apparatus to validate the putrification cell is illustrated in FIG. 7.

Influent water or wastewater is collected in a holding tank and can be spared to remove oxygen or can be aerated. This test system was developed to validate a putrifcation cell could function to remove oxygen from an aerated water or wastewater stream prior to it reaching a bio-electrochemical sensor surface according to the present disclosure.

Methodology: A synthetic water or wastewater containing 825 mg/l sodium acetate trihydrate and BOD pillows as a water or wastewater condition (according to dilution ratios for the BOD dilution method) was mixed as a large batch in a 5 gallon pail. The synthetic water or wastewater was then deoxygenated by bubbling nitrogen through it until the dissolved oxygen measured below 1.5 mg/l. The experiment was split into 4 phases to determine the impact of the putrification cell.

Phase 1: The sample, having been deoxygenated, was sent directly from the pail into the bio-electrochemical sensor. (Putrification cell was flushed with 1 litre of water prior to being connected to the sensor).

Phase 2: The sample, having been deoxygenated, was sent through the putrification cell prior to the bio-electrochemical sensor.

Phase 3: The sample, now continually aerated, was sent through the putrification cell.

Phase 4: Finally, the system was turned off, still with the contents of the probe stirring but no fresh media entering the cell.

Results: Phase 1: Anaerobic water or wastewater was sent direct to the bio-electrochemical sensor and not through the putrification cell.

Figure 8:
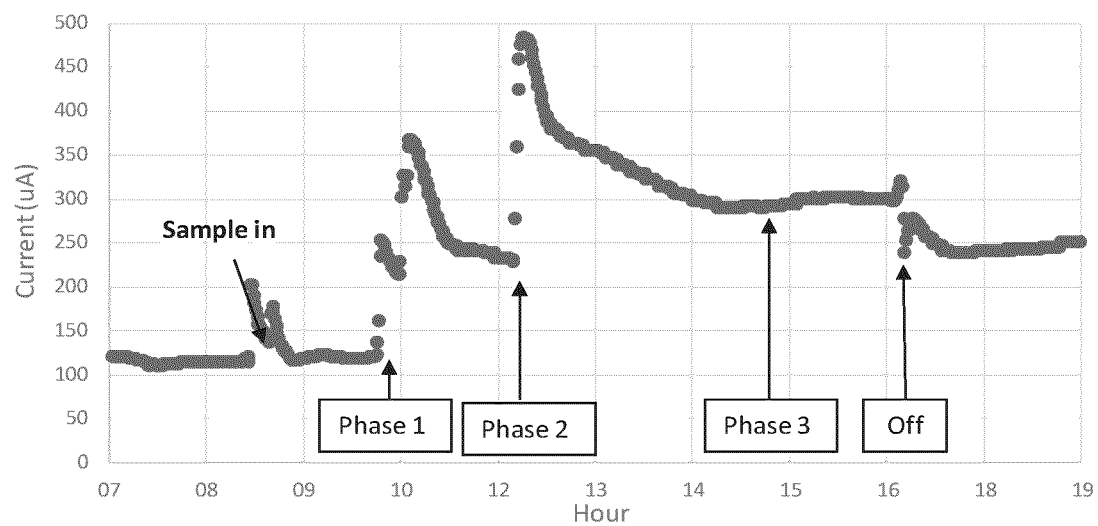
FIG. 8 is a graph illustrating data collected by from a bio-electrochemical sensor according to the present disclosure coupled downstream to the cell illustrated in FIG. 7.

Phase 2: After being in this state for over 2 hours, the system was reconfigured and the putrification cell was put in-line before the bio-electrochemical sensor. A noticeable increase in the signal occurred, however, throughout the 4 hours the putrification cell was attached a measurable increase in the signal was apparent, as illustrated in FIG. 8. It appears that the putrification cell itself is contributing to the signal and generating additional substrate for the bio-electrochemical sensor's biology to consume.

Phase 3: The configuration of the system was not changed, but the pail with the synthetic water or wastewater was aerated. This did not appear to have a material impact on the signal and suggest that the aeration of a sample (at least with a significant BOD) is not of concern to impacting the measurement. The putrification cell is demonstrated to limit any negative impact of oxygen being present in the up-front influent holding tank.

Phase 4: Finally, the pump was turned off while stirring was maintained and the signal decreased modestly (50 μA) to the same conditions as when a flow through sample was provided without going through the putrification cell.

Example 4—Inoculation of Aerobic Tolerant Bio-Electrochemical Microbial Communities The development of anodic microbial communities that are tolerant to oxygen yet continue to utilize the electrode surface for respiration is counter intuitive to the current scientific consensus on how specifically microbial electrolysis cells are thought to operate.

The following procedure for inoculating exo-electrogenic microbial biofilm in a micro-aerobic or aerobic environment has allowed the inventors to select for microbial communities that retain a unique functionality. The ability for bacterial communities to respire to an electrode surface of a bio-electrochemical sensor (specifically of a microbial electrolysis cell) while in the presence of oxygenated water or wastewater.

The procedure does not involve any aspects of sparging water or wastewater streams for the exclusion of oxygen from the inoculation process. Original water or wastewater seed samples are collected typically from aerated zones of a water or wastewater treatment plant. During cell inoculation, there is no sparging of feed water or wastewater or of seed inoculum. Furthermore, an air-tight seal on the sensor inoculation cells is not required.

1. Collect a seed sample. From an already operating bio-electrochemical sensor according to the present disclosure (preferred). Alternatively, from a water or wastewater or environmental source.

2. Mix up liquid feed according to Table 1 in a preferred concentration (recommendation is 25×1 L). Measured out the required masses into a 1 L container and filled the container to the 1 L mark and mixed thoroughly so as to introduce oxygen.

3. To a feed mixing vessel (measuring cup), we added the following: 40 mL of 25× feed solution per Litre; the seed; if starting from previous reactors we used a 1 in 5 dilution for optimal start-up times. (200 ml/1 Litre); and topped up with desired volume of water.

4. Filled all inoculation cups with the seeded feed water, making sure to leave room for displacement when the sensor is added. Mixed thoroughly so as to introduce oxygen.

5. Cells were monitored for biological activity for 48 hours. At this time the cells were emptied and again re-fed with an oxygenated seeded feed water.

6. The feeding cycle of the inoculation process was continued over a 14-day period at which time the exo-electrogenic microbial biofilm were deemed suitable for installation.

TABLE 1

| Component | Diluted Concentration (mg/l) | 25 × Mass (mg) 1 L |
|---|---|---|
| $NaHCO_3$ | 525 | 13125 |
| Casein hydrolysate | 525 | 13125 |
| Meat extract | 350 | 8750 |
| Urea | 90 | 2250 |
| NaCl | 21 | 525 |
| $CaCl_2$ | 10.1 | 252.5 |
| $mgSO4 \cdot 7 H_2 0$ | 7 | 175 |
| Sodium acetate | 250 | 6250 |

Table 1 Adapted synthetic water or wastewater recipe (Peel & Nyberg 1989) used as the inoculation and feed for the SENTRY inoculation cells with the addition of sodium acetate and making a 25× 1 L stock solution.

Example 5—Working Example

Bio-electrochemical sensors according to the present disclosure were installed at three different tie-in locations of a water or wastewater plant on Oct. 10, 2018: one located in a primary clarifier of the water or wastewater plant, one located just before biological nutrient reactors of the water or wastewater plant, and one located at an effluent of the water or wastewater plant.

Primary clarifier installation location: The bio-electrochemical sensor was installed on a moving bridge primary clarifier, which rotated approximately once per hour. It was connected to the moving bridge via PVC pipe and sensed the water or wastewater strength variation.

Prior to biological nutrient removal reactors: The bio-electrochemical sensors was installed just prior to entering the biological nutrient removal reactors.

Effluent sensor location: The bio-electrochemical sensor was installed at the effluent of the bioreactors.

Relevant information gained: The sensor correlated well with TCOD/fCOD/TBOD5 with r2 ranging from 0.49-0.82, when the data was combined the r2 additionally increased.

Figure 9:
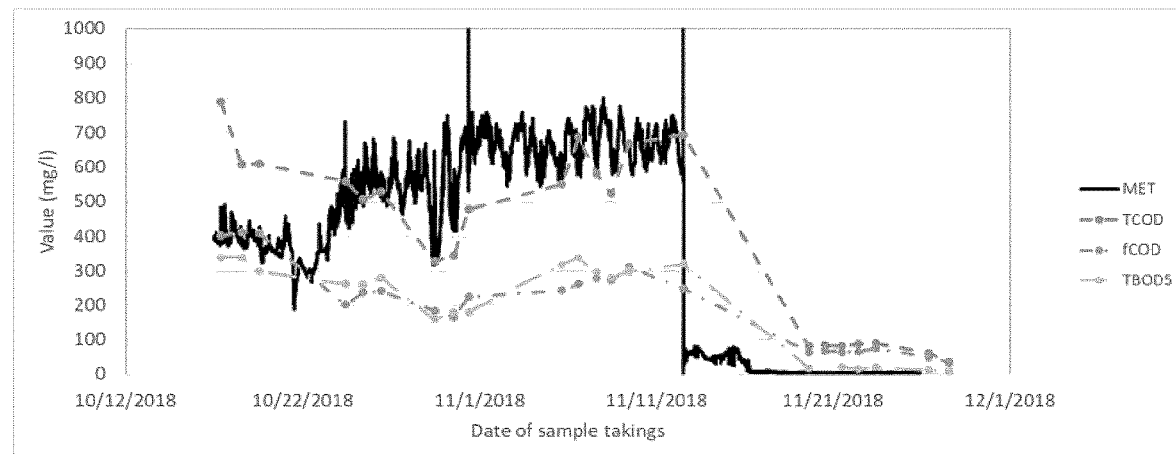
FIG. 9 is a graph illustrating data collected from a bio-electrochemical sensor according to the present disclosure.
Figure 10:
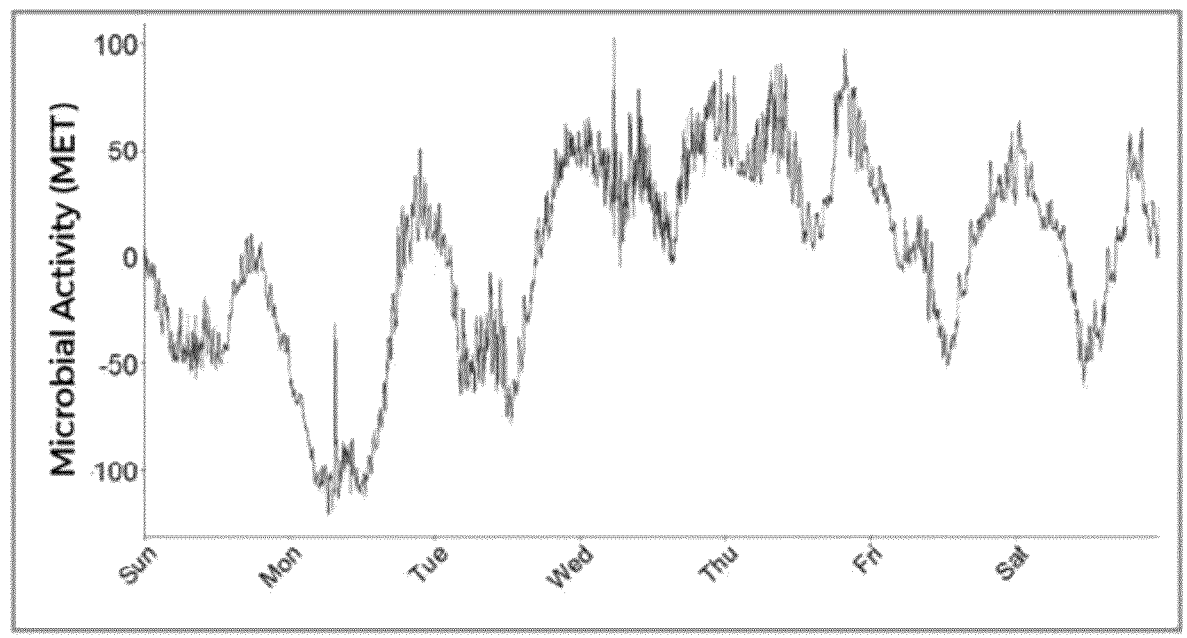
FIG. 10 is a graph illustrating weekly trend data of MET in influent collected from a bio-electrochemical sensor according to the present disclosure.
Figure 11:
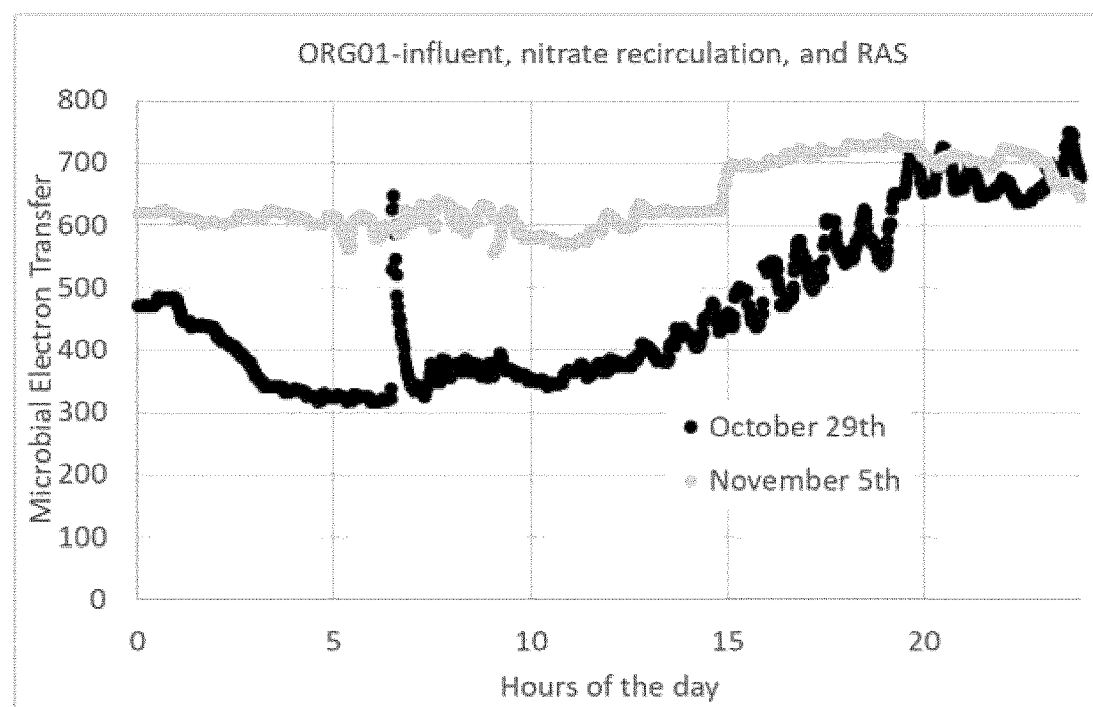
FIG. 11 is a graph illustrating a high change in MET collected from a bio-electrochemical sensor according to the present disclosure on Oct. 29, 2018 compared to baseline data collected on Nov. 5, 2018.

FIGS. 9, 10, and 11 illustrate the measurement results from the influent and effluent sampling. The sensor identified days of the week with the highest organic strength in the influent (Wednesday-Friday) and a time of the day (after 5 pm). The lowest organic strength in the influent occurred on Monday (as well as the weekend), with lowest activity around noon.

Four major events occurred at the facility during this time, with the primary cause of disturbance due to rainfall in the region and additional material being brought into the system.

Example 6—Working Example

The SENTRY system was installed at a Water Treatment Plant. The herein described sensors were used to monitor the biological activity of the water at two key locations at the facility. The facility is using the sensors to help flag abnormal biological activity and abnormal water constituents entering their facility (raw water intake) and leaving the water treatment process—granular activated carbon contactor (GACC). The incoming raw water, which is drawn in from a lake source to the treatment plant, is considered aerobic with a dissolved oxygen concentration in the range of 0.1-5.0 mg/L. The lake is part of the local watershed and impacted by rain events, runoff, seasonal variation and point and non-point discharges from the region, including upstream water or wastewater treatment facilities.

Installation location: Sensor 1 was installed at the raw water intake of the plant. Sensor 2 was installed on the effluent of granular activated carbon contactor (GACC) reactor.

Results: The sensors showed a high level of response to the fluctuations in the water quality in both the Raw Water Intake and the granular activated carbon contactor effluent. A web-based alert system was set in place to flag and email operators at the plant during large fluctuations outside of a specific controlled range. This allows operations staff to take additional samples during imbalance events to further track the change in conditions. Five alert events were tracked during the trial time period. The sensors were able to pick up water or wastewater bypass events from the upstream water or wastewater treatment plant, showing abnormal spikes in both sensor locations.

Initial correlations were drawn with the organic compounds tested by OCWA (TOC/COD/DOC). Correlations were strongest with TOC($R^2$ of 0.68-0.79) and DOC($R^2$ of 0.89), showing the value of the sensor as a real-time estimate on biologically available carbon in the system.

The information that the SENTRY probe provides is unique as it provides data both on the relative organic strength as well as biological response to known and unknown events. Typically, a separate, expensive and complicated sensor would be provided for BOD estimations and there is no probe available to receive instant updates to biological process upsets (ATP test kits are an example of a technology which is a snapshot of the biological health, but they are one-off events and are expensive to run per event).

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A bio-electrochemical sensor for monitoring metabolic activity of a population of aero-tolerant exo-electrogenic bacteria in response to one or more agents in oxygenated water or oxygenated wastewater in a water or wastewater treatment system, the sensor comprising:

at least one electrode pair comprising an anode and a cathode, the anode having a biofilm comprising two or more layers formed thereon, wherein each of the layers of the biofilm comprises aero-tolerant exo-electrogenic bacteria, wherein the anode is in electrical communication with the aero-tolerant exo-electrogenic bacteria for receiving electrons therefrom, a current sensor for measuring electron flow between the anode and the cathode and producing an electrical output that correlates with metabolic activity of the aero-tolerant exo-electrogenic bacteria; and a power source in electrical communication with the electrode pair for delivering a voltage of from about 0.1V to about 1.5V across the electrode pair.

2. The bio-electrochemical sensor of claim 1, wherein the aero-tolerant exo-electrogenic bacteria comprise at least one cytochrome that enables at least one electron to transfer extracellular to the electrically conductive surface and not to the oxygenated environment.

3. The bio-electrochemical sensor of claim 1, wherein the one or more agents is: 1) oxygen; 2) organic matter; 3) an organic carbon compound; 4) a cleaning agent; 5) sodium hypochlorite; 6) peracetic acid; 7) citric acid; or 8) any combination thereof.

4. The bio-electrochemical sensor of claim 1, wherein the oxygenated water or oxygenated wastewater is: 1) an influent water or wastewater stream, and wherein the bio-electrochemical sensor is positionable within the influent water or wastewater stream; 2) an effluent water or wastewater stream, and wherein the bio-electrochemical sensor is positionable within the effluent water or wastewater stream; or 3) a combination thereof.

5. The bio-electrochemical sensor of claim 1, wherein the two or more layers has a thickness of from about 0.2 mm to about 5.0 mm from the surface of the anode.

6. A system for monitoring and/or delivering one or more agents in oxygenated water or oxygenated wastewater in a water or wastewater treatment system, the system comprising:

an aerobic chamber;

a bio-electrochemical sensor for monitoring metabolic activity of a population of aero-tolerant exo-electrogenic bacteria and providing an electrical output corresponding with the metabolic activity, the bio-electrochemical sensor comprising:

at least one electrode pair, each electrode pair comprising an anode and a cathode located within the aerobic chamber, the anode having a biofilm comprising two or more layers formed thereon, wherein each of the layers of the biofilm comprises aero-tolerant exo-electrogenic bacteria, a power source for delivering a voltage of from about 0.1V to about 1.5V across the electrode pair; and an electrical output analyzer for analyzing the electrical output and correlating the electrical output with the one or more agents in the water or wastewater treatment system; and optionally a pump operably coupled to the electric output analyzer for controlling the delivery of the one or more agents.

7. The system of claim 6, wherein the aero-tolerant exo-electrogenic bacteria comprise at least one cytochrome that enables at least one electron to transfer extracellular to the electrically conductive surface and not to the oxygenated environment.

8. The system of claim 6, wherein the one or more agents is: 1) oxygen; 2) organic matter; 3) an organic carbon compound; 4) a cleaning agent; 5) sodium hypochlorite; 6) peracetic acid; 7) citric acid; or 8) any combination thereof.

9. The system of claim 6, wherein the oxygenated water or oxygenated wastewater is: 1) an influent water or wastewater stream, and wherein the bio-electrochemical sensor is positionable within the influent water or wastewater stream; 2) an effluent water or wastewater stream, and wherein the bio-electrochemical sensor is positionable within the effluent water or wastewater stream; or 3) a combination thereof.

10. The system of claim 6, wherein the system further comprises a heater operably coupled to the electric output analyzer for controlling the amount of thermal energy delivery to the oxygenated water or oxygenated wastewater.

11. The system of claim 6, wherein the two or more layers has a thickness of from about 0.2 mm to about 5.0 mm from the surface of the anode.

12. A method of monitoring one or more agents in oxygenated water or oxygenated wastewater in a water or wastewater treatment system, the method comprising:

applying a voltage of from about 0.1V to about 1.5V to a bio-electrochemical sensor comprising: at least one electrode pair comprising an anode and a cathode, the anode having a biofilm comprising two or more layers formed thereon, wherein each of the layers of the biofilm comprises aero-tolerant exo-electrogenic bacteria;

measuring an electrical output of the bio-electrochemical sensor and correlating the output with the one or more agents in the water or wastewater treatment system.

13. The method of claim 12, wherein the aero-tolerant exo-electrogenic bacteria comprise at least one cytochrome that enables at least one electron to transfer extracellular to the electrically conductive surface and not to the oxygenated environment.

14. The method of claim 12, further comprising controlling the delivery of the one or more agents in the oxygenated water or oxygenated wastewater in a water or wastewater treatment system, the method further comprising:

delivering the one or more agents into the system;

monitoring a change in the electrical output in response to the one or more agents; and adjusting the delivery of the one or more agents in response to a change in the electrical output.

15. The method of claim 12, wherein the oxygenated water or oxygenated wastewater is: 1) an influent water or wastewater stream; 2) an effluent water or wastewater stream; or 3) a combination thereof.

16. The method of claim 12, wherein the one or more agents is: 1) oxygen; 2) organic matter; 3) an organic carbon compound; 4) a cleaning agent; 5) sodium hypochlorite; 6) peracetic acid; 7) citric acid; or 8) any combination thereof.

17. The method of claim 12, wherein the method further comprises adjusting a heater to control the amount of thermal energy delivery to the oxygenated water or wastewater in response to a change in the electrical output beyond a threshold.

18. The method of claim 12, wherein the two or more layers has a thickness of from about 0.2 mm to about 5.0 mm from the surface of the anode.

\* \* \* \* \*